Nov. 30, 1965 M. F. HOOVER 3,220,336
BARBECUE GRILL
Filed Oct. 7, 1963 2 Sheets-Sheet 1

INVENTOR.
MARTIN F. HOOVER
By [signature]
ATTORNEY

Nov. 30, 1965   M. F. HOOVER   3,220,336
BARBECUE GRILL
Filed Oct. 7, 1963   2 Sheets-Sheet 2

INVENTOR.
MARTIN F. HOOVER
By
ATTORNEY

United States Patent Office 3,220,336
Patented Nov. 30, 1965

3,220,336
BARBECUE GRILL
Martin F. Hoover, 3601 E. Market St., York, Pa.
Filed Oct. 7, 1963, Ser. No. 314,390
7 Claims. (Cl. 99—399)

This invention relates to a barbecue grill and, more particularly, to a barbecue grill adapted for use, with appropriate provisions, to either outdoor or indoor use and preferably of relatively large capacity. More particularly, the grill is of the type which also preferably is arranged to derive its heat from glowing, combustible material such as a bed of charcoal briquettes or the like, but is not to be restricted thereto.

The barbecue cooking of foodstuff in relatively large quantities and especially halves of chickens, steaks and the like, presently is performed on large flat grills extending across spaced walls of brick or concrete blocks. Upon the bottom of the space defined by said walls, a layer of charcoal briquettes are disposed to provide the heat by which the barbecuing of foodstuff disposed upon said horizontal grill takes place. In order that both sides of the foodstuff such as chicken or steaks may be cooked satisfactorily, the grills are either rotated about an axis extending transversely intermediately of the ends thereof and extending between and across the top surfaces of the spaced walls, or the individual pieces of food are turned over manually. Such operation is time-consuming and operating the grill in the direct presence of the intense heat provided by the charcoal grill is highly uncomfortable to the operators. Heat waste to atmosphere also is substantial and only one side of the food at a time is roasted.

It is the principal object of the present invention to provide an outdoor or indoor type of barbecue grill of relatively large capacity which is capable of utilizing a bed of charcoal briquettes or otherwise, to furnish the heat and thereby provide the expected and customary flavor which this type of heat appears to impart to meat type foodstuffs when cooked over such bed of briquettes but the various grills which actually hold the foodstuff are both loaded and unloaded while removed from the bed of coals, thereby permitting relatively comfortable operation of the barbecue grill comprising the invention.

Another object of the invention is to utilize a rotatable reel frame of substantial length and diameter and having end members between which a plurality of grill means extend, whereby the foodstuff loaded in said individual grill means sequentially is moved, preferably within a housing enclosing the rotatable reel frame to provide for maximum efficiency of the heat consumed from the upper portion of the enclosure, downwardly toward and across the bed of hot briquette coals, and then upwardly and away from said bed while successive individual grill means follow the same path, this procedure being continued until the entire load of foodstuff carried by the individual grill means of the rotatable reel are barbecued to the desired degree.

Further object of the invention is to provide a series of individual grill means on the rotatable reel frame and extend circumferentially around the periphery thereof, as well as extending between said end members of the reel frame, said individual grill means each comprising a series of preferably parallel bars extending transversely between the spaced end members and fixed thereto, and a grill frame pivotally connected, preferably at the ends thereof, so as to be swingable toward and from the fixed bars on said end members, the pivoted grill frames also comprising a series of parallel spaced bars fixed at the ends thereof to end plates mounted respectively adjacent the end members of the reel frame and suitable latch means maintain the movable grill frames in operative position relative to the fixed grill bars of the reel frame wherein the bars of the grill frames are spaced a limited distance from the fixed bars so as clampingly to hold pieces of foodstuff, and especially meat of different kinds, therebetween while being roasted in the barbecue grill.

Still another object of the invention is to provide both a base frame which is stationary relative to the bed of coals and a movable frame which is slidable substantially horizontally relative to a portion of the base frame and rotatably supporting the reel frame, whereby said movable frame may be moved slidably upon the base frame relative to the front of the enclosure so as to move the reel frame, which is positioned directly above the bed of coals while operating, to a loading and unloading position which is forwardly of said bed of coals or other heat source.

As an adjunct to the foregoing object, it is still another object to provide bearings for the rotatable reel frame, which are positioned preferably exteriorly of the sides of the housing which encloses the rotatable reel frame and, still further, power means which preferably comprises an electric motor is supported suitably on bracket-like frame means exteriorly of one side of the housing, there also being a drive connection between said motor and the shaft upon which the reel frame rotatably is supported for purposes of slowly revolving the reel while disposed above the heat source, whereby when the exterior surface of the food being barbecued or roasted is adjacent the bed of coals, for example, it will be cooked, whereas when the reel is rotated and the various grill units thereon are disposed uppermost in the enclosure, the inner surfaces of the food within the grill units is subjected to relatively intense heat in the upper portion of the enclosure and thereby becomes fully cooked to the degree desired. Thus, both surfaces of the food become cooked while firmly clamped to the grill units and without requiring any reversing or other handling.

One further object of the invention is to provide frame extensions extending forwardly from the front face of the enclosure so as to fully support the movable frame upon which the reel frame is rotatably supported, whereby although the reel frame and especially the grill means thereon when loaded with foodstuff is quite heavy, ample support therefor is provided by such extensions of the movable frame, coupled with the fact that vertical supports at the outer ends of said frame extensions also are provided.

Ancillary to the immediately foregoing object, still another object is to provide on the movable frame a front vertical wall for the housing, the same being fixed to the movable frame for movement toward and from the front edges of the sides of the housing thereby providing ready means for totally enclosing the reel frame and the grill means thereon when disposed in operative position directly above the bed of coal. Further in regard to this object, it is contemplated that the housing preferably terminates upwardly in gable-like upwardly and inwardly sloping front and rear cover plates, the front cover plate preferably being hinged at its upper edge to the uppermost portion of the enclosure and upon elevating said front cover plate, the opening through which the rotatable reel frame moves is rendered ample in size.

Details of the foregoing objects and of the invention, as well as other objects thereof, are set forth in the following specification and illustrated in the accompanying drawings comprising a part thereof.

Figure 1:
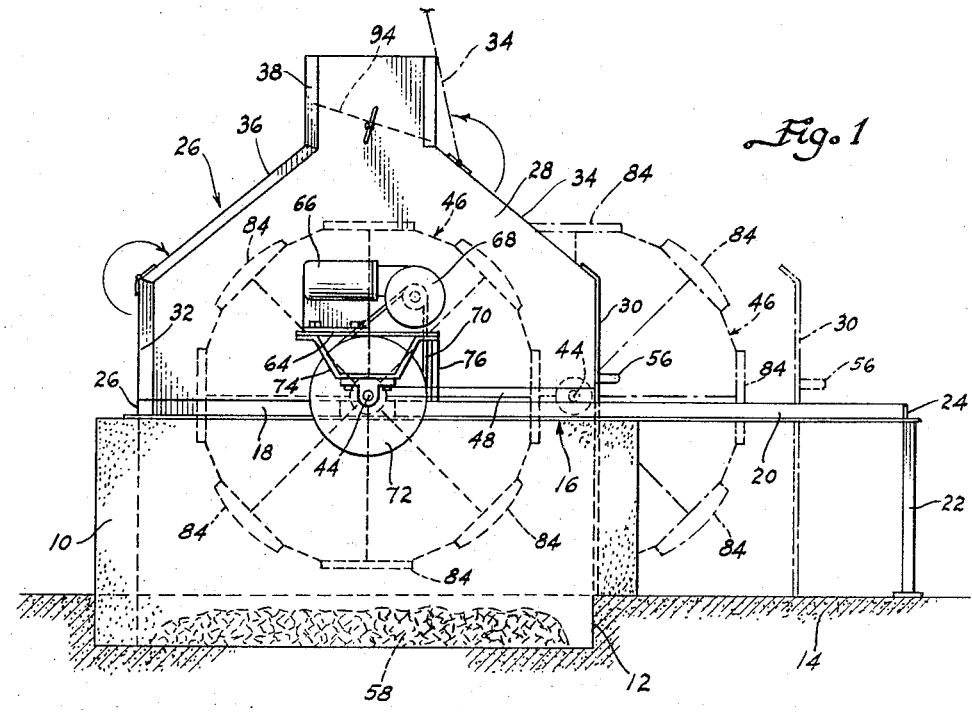
FIG. 1 is an exemplary side elevation of a barbecue grill embodying the principles of the present invention and in dotted lines the reel frame is shown disposed in operative position within the housing therefor, while, in phantom, the reel frame is shown extended in loading and unloading position.

Referring to the drawings, there is illustrated in FIG. 1, a base wall arrangement 10 which, for example, may be constructed suitably of either permanent or temporary types of masonry, such as that utilizing concrete blocks. If desired, the base wall arrangement 10 may extend into a shallow cavity 12 dug into the ground 14 or, for indoor use, appropriate insulating hearth means are used. Supported upon the upper edge of the base wall 10 is a stationary base frame 16 comprising a pair of spaced side members 18 which, in the preferred construction, comprise structural steel members such as angle irons of suitable size, the forward ends thereof extending beyond the front edges of the side base walls 10 to comprise supporting extensions 20. The outer ends of such extensions preferably are supported vertically by appropriate structural posts 22 extending upward from the ground or floor surface. The forward and rearward ends of the side members 18 and their supporting extensions 20 are connected respectively by end members 24 and 26 which are of similar nature to the side members 18.

A housing 26, comprising opposite side members 28, a front wall 30, a rear wall 32, and front and rear sloping upper covers 34 and 36, all composed of sheet metal of suitable composition and gauge, such as aluminum, galvanized sheet iron, stainless steel, or the like, extend upwardly from base frame 16. The rear wall 32 preferably is connected to the rear edges of the side members 28 of the housing and the rear sloping upper cover 36 also is connected at its opposite edges to the rear upwardly sloping edges of the side members 28. The upper ends of the side members 28 and the upper edges of the front and rear sloping covers 34 and 36 terminate preferably in a vertical flue 38, which, for indoor use, can be connected to a chimney. Also, rear wall 32 preferably has an opening 40 therein, see FIG. 9, normally closed by a hingedly connected cover carried by the lower edge of rear cover 36, charging the bed of coals with additional fuel from time to time.

Extending transversely between and through the side members 28 adjacent the lower edges thereof, is a rotatable shaft 44 which is of steel or the equivalent and of suitable diameter to support thereon a reel frame 46. The side members 28 of the housing have horizontal slots 48 therein through which the opposite ends of the shaft 44 extend. Fixed to the shaft 44 respectively adjacent the inner surfaces of the side members 28 of the housing are a pair of end members 50 comprising essential parts of the reel frame 46 and resembling spoked wheels, the hubs of which are fixedly secured to the shaft 44 by any suitable means.

Figures 8, 9, 10:
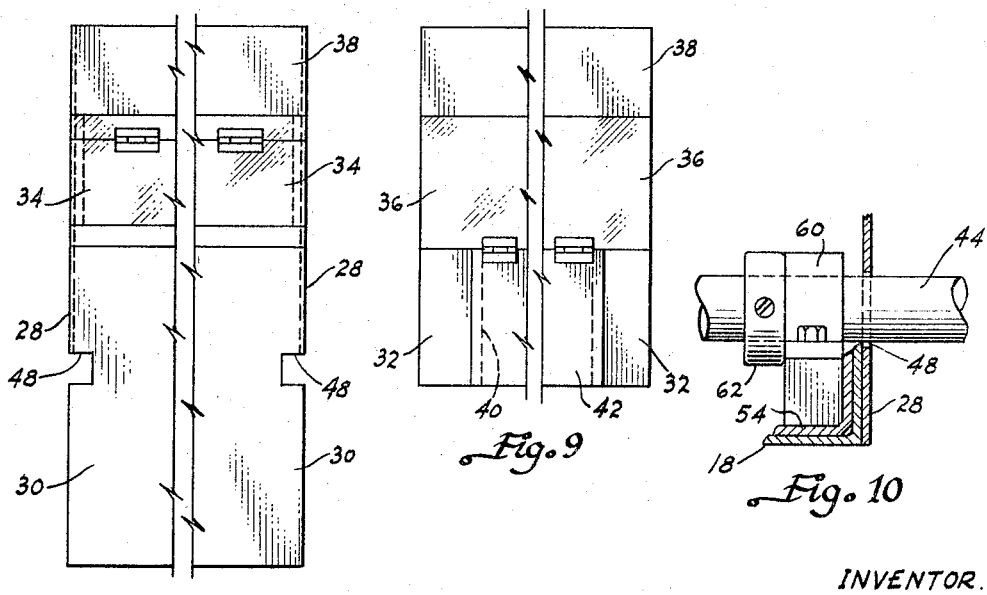
FIG. 8 is a vertical front elevation, broken away intermediately of the ends thereof to foreshorten the view, and illustrating the front portion of the housing enclosing the reel frame.
FIG. 9 is a rear elevation of the housing for the reel frame foreshortened similarly to FIG. 8.
FIG. 10 is a fragmentary, vertical sectional view extending through portions of the side members of the base frame and movable frame and illustrating the manner in which one of the bearings for the shaft of the reel frame is supported by the movable frame.
Figure 7:
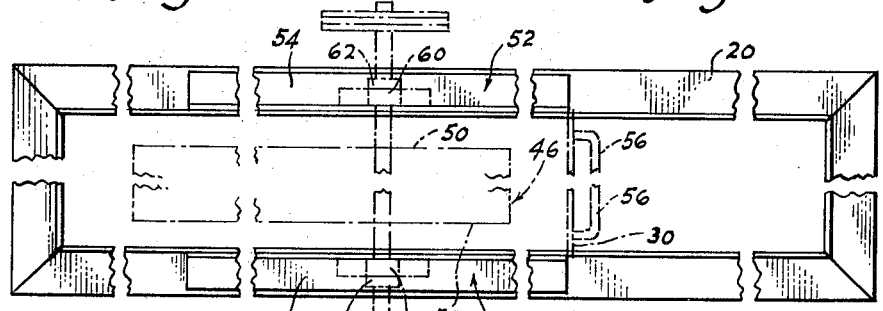
FIG. 7 is a top plan view of the fixed base frame and movable frame shown associated therewith, the individual side and end members comprising the base frame and the side members of the movable frame being interrupted to foreshorten the view in both horizontal and vertical directions relative to the sheet of the drawing.

The shaft 44 and the reel frame 46 carried thereby are supported upon a movable frame 52 comprising a pair of side members 54, see FIGS. 7 and 10 especially, which preferably are formed from angle iron stock complementary in shape to the inner surfaces of the side members 18 of the base frame relative to which the side members 54 are supported for longitudinal slidable movement. The front ends of the side members 54 of said movable frame are fixedly connected to opposite edges of the front wall 30 of the housing. One or more handles 56 may be connected to the front wall 30 so as to extend forwardly therefrom and preferably horizontally, whereby the same readily may be manipulated by an operator to move the frame 52 and the reel frame 46 supported thereby from a completely enclosed position within the housing 26, as shown in dotted lines in FIG. 1, wherein the reel is directly mounted over a bed of coals 58 which, for example, may be located within the shallow cavity or pit 12 as shown in FIG. 1, and an extended, loading and unloading position, as shown in broken lines in FIG. 1.

The shaft 44 is supported rotatably upon the side members 54 by means of suitable bearing blocks 60, positioning collar 62 also being fixed to the shaft 44 respectively adjacent the opposite ends of bearing blocks 60, as shown in FIGS. 7 and 10. Further, the bearing blocks 60 preferably are mounted exteriorly of the sheet-like side members 28 of housing 26, as shown, for example, in FIG. 10, whereby the bearings and the lubrication thereof will not be subjected to the intense heat existing within the housing 26 when the barbecue grill is operating.

Figure 2:
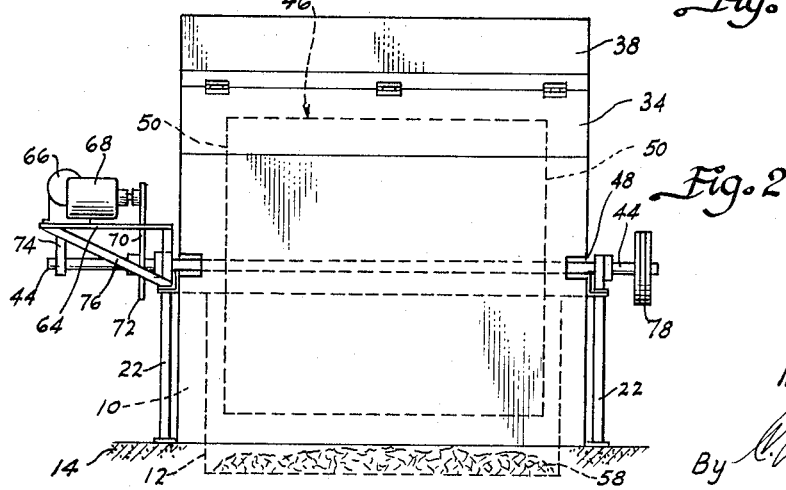
FIG. 2 is a front elevation of the barbecue grill shown in FIG. 1.

Also supported jointly between one of the side members 54 of the movable frame and one projecting end of shaft 44 is a bracket frame 64, see FIG. 2, which supports a motor 66 connected to an appropriate transmission 68 embodying reduction gearing and having a pulley or sprocket gear thereon around which a belt or sprocket chain 70 passes so as to be connected to driven pulley or sprocket gear of transmission 68, whereby motor 66, which preferably is electric, will very slowly revolve the reel frame 46 about the axis of shaft 44.

As seen from FIGS. 1 and 2, even though the motor 66 in transmission 68 may be of a reasonable amount of weight, the bracket frame 64 nevertheless readily may be supported adequately through the means of a pillow frame or block and bearing 74 thereon which extends vertically between the terminal end of shaft 44 and the outer portion of bracket frame 64 as best shown in FIG. 2. Further, diagonal brace means 76 also may be employed further to stabilize the bracket frame 64 relative to the movable frame 52 and shaft 44.

The above-described arrangement for positioning and supporting motor 66 and the driving means actuated thereby for shaft 44 serve to maintain the operation of such power means and drive means exteriorly of the housing 26 and thereby the motor and drive means is not subjected to the heat of the interior of the housing when the barbecue grill is operating. Even though said driving mechanism nevertheless is mounted exteriorly of the housing, by reason of the opposite ends of the shaft 44 extending through the slots 48 disposed within the side members 28, approximately midway thereof to the front edge of said side members, the driving mechanism readily moves with the movable frame 52 and the reel frame 46 carried thereby between the two positions of the latter shown respectively in dotted and broken lines in FIG. 1.

To prevent the possibility of the driving mechanism exerting a cantilever effect upon the end of shaft 44 which supports it and thereby tend to elevate the opposite end of shaft 44, it is contemplated within the concept of the present invention to employ suitable counterweight means 78 which are fixed upon the opposite end of shaft 44 from that which supports the driving mechanism.

Simple but highly effective grill units are provided by the present invention in the form of fixed grill means 80 which, in the preferred construction of the invention, consist simply of a plurality of spaced, parallel rods 82, such as steel well rod stock. Said rods may be fixed appropriately to the peripheral portions of the axially spaced end members 50 of the reel frame 46 by welding, bolting, riveting, or otherwise. The rods 82 are spaced apart adequately to provide ample areas for the food to be exposed to heat but without danger of the food supported by the grill means becoming dislodged therefrom and falling from the reel frame 46.

Figures 3, 4:
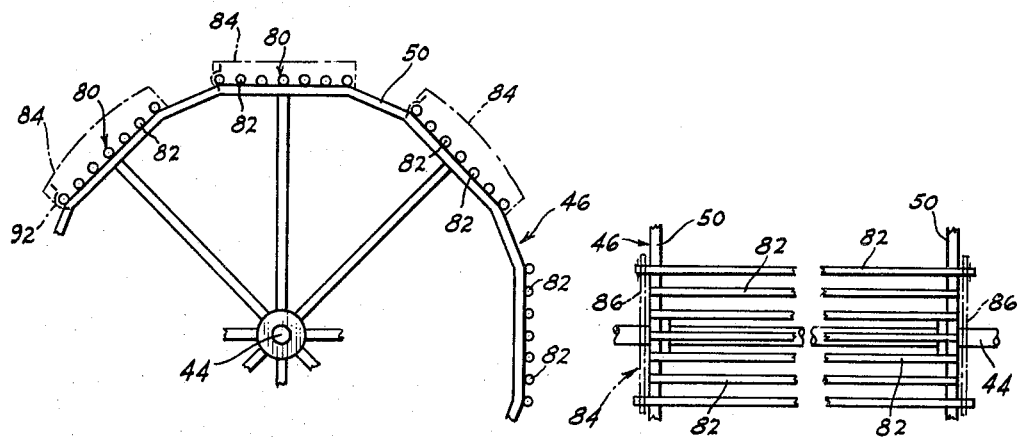
FIG. 3 is a fragmentary side elevation of a portion of one end member of the reel frame and illustrating, in phantom, an outline of the individual grill frames which are movably connected to grill means fixed to said end members.
FIG. 4 is a fragmentary plan view, foreshortened, and illustrating an exemplary arrangement of movable grill frame shown associated with fixed grill means of the type illustrated diagrammatically in FIG. 3.
Figures 5, 6:
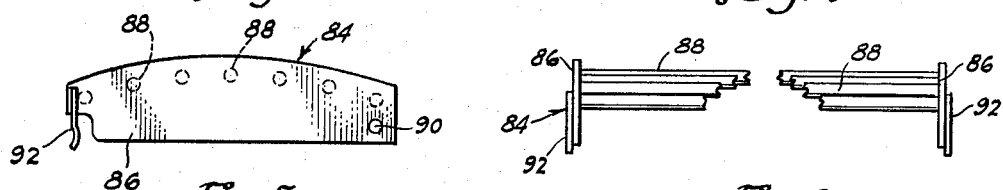
FIG. 5 is an end view of one type of movable grill frame construction shown in FIG. 3.
FIG. 6 is a fragmentary, foreshortened front edge view of the grill frame shown in FIG. 5.

From both FIGS. 1 and 3, it will be seen that the various grill units which each are composed of a series of fixed grill means 80 preferably are spaced a limited distance apart periphery of the reel frame. The various grill units also each include grill frames 84 which, in their simplest and preferred form, comprise a pair of similar end plates 86 between which a plurality of rods 88 extend, these being similar to rods 82, and the opposite ends of said rods either project through drilled holes in the end plates 86 or said ends of the rods may be welded against the inner faces of end plates 86. Such arrangement in either event provides a relatively rigid grill frame 84. Each of the side plates 86 also, adjacent one end, are provided with a bearing hole 90, while resilient latches 92 are connected to the opposite ends of said end plates.

From FIG. 4 particularly, it will be seen that the outermost rods 82 of each of the fixed grill means 80, at the outer ends thereof, project beyond the end members 50. Said projecting ends of one of the endmost rods 82 extend through the bearing holes 90 in the end plates 86 of the movable grill frames 84 so as to provide pivots therefor and thus connect said grill frames 84 effectively to the reel frame 46 and especially the end members 50 thereof. The projecting ends of the outermost rod 82 at the opposite side of each of the fixed grill means 80 are engaged by the latch members 92 of each of the grill frames 84 and thereby releasably connect said grill frames in operable position relative to the fixed grill means 80 around the periphery of the reel frame 46.

There is illustrated in exemplary manner in FIGS. 1 and 3, several possible contours for the grill frames 84. For example, alternate grill frames 84 may have a slightly arched outer contour, while the grill frames 84 interspersed therebetween may have a substantially flat outer contour whereby the rods 88 thereof are substantially equally spaced from the rods 82 of each of said grill units. The grill units with curved outer contours however define spaces of varying depth respectively between the rods 88 thereof and the rods 82. However, if desired, all of the grill units may be either of one form or the other, if desired, or any other variation of said forms, all within the spirit of the present invention.

The material from which the housing 26, reel frame 46, and the grill units supported thereon are formed may vary in accordance with the desires of the purchaser. For example, if the mechanism is subjected to substantially continual use, fabrication of the various components from appropriate steel will be satisfactory, especially if the sheet metal from which the housing is formed is non-rusting, such as sheet aluminum, or is galvanized or otherwise rust-proofed if steel is used. However, if desired and the expense thereof is not objectionable, either some or all of the material may be stainless steel, especially the plates or sheet material from which the housing and its various components are formed. Such stainless steel readily will resist rusting when subjected to the elements. This aspect of the invention also applies to the other components such as the fixed and movable frame and the mechanism for supporting the drive means.

To permit appropriate control of the heat conditions within the housing, a damper 94 of suitable nature may be provided within the chimney 38, the same having an appropriate exterior manipulating handle of conventional type. Also, due to the sloping arrangement of front and rear upper covers 34 and 36 and the relatively close positioning otherwise of the sides and ends of housing 26 generally to the periphery and ends of reel frame 46, considerable efficiency in the use of heat results.

In operating the barbecue grill comprising the invention, a movable frame 52 and the reel frame 46 rotatably carried thereby are moved to the forward, broken line position illustrated in exemplary manner in FIG. 1 for purposes of loading each of the grill units extending around the periphery of the reel frame and between the opposite end members 50 thereof. The movable grill frames 84 readily are moved to open position relative to the fixed grill means 80 of each of the units, whereby foodstuff to be barbecued such as halves of chickens, steaks, or the like, readily may be laid upon the rods 82 of the fixed grill means. When each of such grill units have been loaded, the grill frames 84 are moved to closed position and held therein by the latches 92. Without starting the motor 66, the next grill units to be loaded may be moved into convenient position for that purpose simply by manually revolving reel frame 46 and, upon said next unit being loaded, its grill frame 84 is snapped into closed position, following which the next successive grill unit is loaded, and so on until all of the grill units of the entire reel frame are filled with foodstuff to be barbecued.

Following such loading of the various grill units of the reel frame 46, the movable frame 52 which carries said reel frame then is moved back to its retracted or operative position illustrated in dotted lines in FIG. 1, such movement simultaneously closing the open front face of the housing due to front wall 30 now extending thereacross in effective sealing relationship. Incidentally, the front wall 30 extends vertically downward substantially to the level of the ground or other surface which supports the barbecue grill comprising the invention. Further, to minimize the interior space of the housing 26 which must be heated, relative to the size of the reel frame 46 and the grill units mounted thereon, not only is the front vertical face of the housing open when the reel frame 46 is in its extended, loading or unloading position, but the front sloping upper cover 34 also is raised to the broken line position thereof shown in FIG. 1, thereby providing completely adequate space through which the reel frame 46 may move between so-called roasting or grilling position and the extended or loading and unloading position, even though the housing components closely conform to the outline of the reel frame 46. Thus, when the reel frame 46 is moved to the interior, roasting or grilling position, the front cover 34 is lowered to its closed position wherein the lower, forward edge thereof overlies an angular upper flange preferably provided at the upper edge of the front wall 30 as shown in FIG. 1.

Following the positioning of the reel frame 46 in operative, roasting or grilling position within the housing 26, the motor 66 is activated and the reel frame 46 slowly is revolved for the required period of time to roast or barbecue the foodstuff carried by the reel frame to the satisfaction of the operator. During such operation, the front cover 34 may be raised from time to time, especially for purposes of spraying the foodstuff with conventionally used sauces and seasoning or other barbecuing liquids which enhance the cooking and improve the flavor of the foodstuff. The cover 34 then is lowered to its closed position and barbecuing is continued until completed, whereupon the front cover 34 is raised to the broken line position, handle 56 is pulled outwardly by the operator to move the frame 52 forwardly and thereby also move the reel frame 46 and all the grill units carried thereby to the extended, unloading position shown in broken lines in FIG. 1, whereupon each of the grill frames 84 successively is unlatched and opened to remove the barbecued foodstuff therefrom. If desired, after each unit is unloaded, it immediately may be filled again with either raw or partially cooked foodstuff which is to be barbecued, thereby minimizing time consumed in barbecuing very substantial quantities of foodstuff, depending upon the capacity of the total number of grill units formed upon the reel frame 46.

Although the present invention is not to be restricted as to size, inasmuch as the basic principles of the invention may be adapted to barbecue grill assemblies within a relatively wide range of sizes, it has been found that a barbecue grill of the type illustrated and described herein having a reel frame 46 of the order of between 30 and 48 inches in both length and diameter has proven to be highly suitable and effective without being unwieldy and difficult to operate.

From the foregoing, it will be seen that the present invention provides a barbecue grill construction, which can be used indoors or outdoors, in which substantial quantities of foodstuff may be cooked by barbecuing efficiently through the employment of a power driven rotatable reel frame upon which a plurality of grill units extend both peripherally as well as transversely in a direction parallel to the axis of rotation, the method of performing the barbecuing operation through such rotation resulting in complete barbecuing of the foodstuff on both sides thereof without requiring reversing of any of the grill means during operation thereof as now is present in most conventional type of barbecue grilling operations and especially those of an outdoor nature. Also, the food does not have to be disturbed in the grill means from the time it is loaded until barbecuing is completed.

Further, and of equal importance to the efficient operation of the barbecue grill arrangement from a fuel and power consumption standpoint is the fact that the loading and unloading of the grill units supported by the rotatable reel frame is accomplished while the same are removed from an operative position directly above the bed of coals or the like, which are used to effect the barbecue grilling, to a relatively cool location spaced therefrom, thereby affording far greater comfort to the operator than barbecue arrangements presently used and especially those of an outdoor nature.

While the invention has been described and illustrated in its several preferred embodiments, it should be understood that the invention is not to be limited to the precise details herein illustrated and described since the same may be carried out in other ways falling within the scope of the invention as claimed.

I claim:

1. A rotary barbecue grill comprising in combination, a supporting frame positionable adjacent a source of heat adequate to cook foodstuff by barbecuing, bearings mounted at opposite sides of said supporting frame substantially in horizontal alignment, a rotatable drum-like reel frame having opposite ends spaced axially apart and shaft means respectively thereon supported for rotation within said bearings, said reel frame also including grill means fixed to and extending between said opposite ends of said reel frame and positioned in substantially evenly spaced relationship around the periphery of said reel frame to support foodstuff on the outer surfaces thereof, a plurality of auxiliary grill frames movably supported by said reel frame respectively adjacent but outwardly from the outer surfaces of said fixed grill means and movable toward and from substantially parallel spaced relation to said outer surfaces of said fixed grill means of said reel frame to hold therebetween foods to be barbecue grilled by a source of heat relative to which said reel revolves, means detachably latching said auxiliary grill frames in operative position relative to said outer surfaces of said fixed grill means of said reel frame, and means interconnected to said reel frame and operable to rotate it relative to said source of heat.

2. The barbecue grill set forth in claim 1 further characterized by said fixed grill means on said reel frame comprising a series of parallel bars fixed at the ends thereof respectively to the ends of said reel frame, and said auxiliary grill frames having end members pivotally connected adjacent one end of each of said end members respectively to the opposite ends of said reel frame.

3. The barbecue grill set forth in claim 2 further characterized by said fixed grill means on said reel frame comprising a series of parallel bars extending between and fixedly connected at the ends thereof to said ends of said reel frame, the ends of certain of said bars projecting beyond the ends of the other bars and comprising pivot means to which said end members of said auxiliary grill frames are connected.

4. The barbecue grill set forth in claim 3 further including latch means on said movably supported auxiliary grill frames releasably interengageable with certain of the bars of said fixed grill means on said reel frame to secure said grill frames in operative position adjacent said fixed grill means on said reel frame.

5. A rotary barbecue grill comprising in combination, a stationary base frame positionable adjacent a source of heat adequate to cook foodstuff by barbecuing and including spaced parallel guides supported substantially horizontally, a movable frame supported by said guides of said base frame for movement toward and from said source of heat, bearings carried by the opposite sides of said movable frame, a real frame having opposite ends spaced axially apart, grill means fixed to and extending between said opposite ends of said reel frame and positioned around the periphery thereof to support foodstuff thereon, shaft means supporting the opposite ends of said reel frame by said bearings, and a housing comprising front, rear and side walls surrounding said movable frame and reel frame carried thereby and extending upward to form a hood terminating substantially at the top in a flue, at least the major portion of said front wall of said housing being fixed to said movable frame and movable therewith relative to the side walls of said housing and said hood adjacent said front wall including a lid hingedly supported horizontally at the upper edge thereof relative to said housing and movable upwardly about the axis of said hinge to enlarge the opening at the front of said housing when said front wall is removed therefrom and thereby facilitate the outward and inward movement of said reel frame relative to said housing for loading and unloading of the grill means carried thereby.

6. The barbecue grill set forth in claim 5 further including power means comprising a motor, support means carried by one side of said movable frame adjacent one end of said shaft means for said reel frame exteriorly of one side of said housing and movable with said movable frame, said motor being connected to said support means for movement therewith, and means connecting said motor and shaft means to rotate the latter thereby.

7. The barbecue grill set forth in claim 6 further characterized by said one side of said housing having a slot therein and one end of said shaft extending therethrough, to permit movement of said reel frame toward and from the front face of said housing.

(References on following page)

References Cited by the Examiner

UNITED STATES PATENTS

| | | | |
|---|---|---|---|
| 2,004,775 | 6/1935 | Wright | 99—346 |
| 2,144,918 | 1/1939 | Garvis | 99—37 |
| 2,558,569 | 6/1951 | Koch. | |
| 2,562,713 | 7/1951 | Harrison | 99—339 X |
| 2,746,377 | 5/1956 | Parks | 99—421 |
| 2,774,148 | 12/1956 | Worth. | |

FOREIGN PATENTS

| | | |
|---|---|---|
| 109,664 | 5/1928 | Austria. |
| 12,236 | 9/1887 | Great Britain. |
| 19,462 | 12/1900 | Great Britain. |

WALTER A. SCHEEL, *Primary Examiner.*

JEROME SCHNALL, ROBERT E. PULFREY,
*Examiners.*